United States Patent [19]

Griffin

[11] Patent Number: 5,371,444
[45] Date of Patent: Dec. 6, 1994

[54] ELECTRONIC BALLAST POWER SUPPLY FOR GAS DISCHARGE LAMP INCLUDING BOOSTER START CIRCUIT RESPONSIVE TO POWER UP CONDITION

[75] Inventor: Raymond T. Griffin, Plano, Tex.

[73] Assignee: The Genlyte Group Incorporated, Secaucus, N.J.

[21] Appl. No.: 50,551

[22] Filed: Apr. 20, 1993

[51] Int. Cl.⁵ .................................. G05F 1/00
[52] U.S. Cl. ............................ 315/291; 315/292; 315/293; 315/307; 315/308; 315/195; 315/DIG. 5
[58] Field of Search ............. 315/291, 292, 293, 307, 315/308, 194, DIG. 5, DIG. 2

[56] References Cited

U.S. PATENT DOCUMENTS

| | | | |
|---|---|---|---|
| 3,968,401 | 7/1976 | Bryant | 315/293 |
| 4,148,792 | 6/1979 | Kuroi et al. | 315/86 |
| 4,277,728 | 7/1981 | Stevens | 315/307 |
| 4,317,071 | 2/1982 | Murad | 315/293 |
| 4,327,309 | 4/1982 | Wallot | 315/170 |
| 4,340,843 | 7/1982 | Anderson | 315/205 |
| 4,376,911 | 3/1983 | Kaneda | 315/244 |
| 4,743,835 | 5/1988 | Bosse et al. | 323/266 |
| 4,782,268 | 11/1988 | Fähnrich et al. | 315/200 R |
| 5,023,519 | 6/1991 | Jensen | 315/242 |
| 5,065,074 | 11/1991 | Hesketh et al. | 315/209 R |
| 5,142,202 | 8/1992 | Sun et al. | 315/225 |

Primary Examiner—Robert J. Pascal
Assistant Examiner—Reginald A. Ratliff
Attorney, Agent, or Firm—Dennis T. Griggs

[57] ABSTRACT

A kickstart system and method for operating gas discharge lamps is disclosed wherein the amplitude and frequency of the starting voltage are raised for a predetermined period of time to ionize the gas within the lamp and thereafter reduced to steady state operating levels.

9 Claims, 2 Drawing Sheets

ELECTRONIC BALLAST POWER SUPPLY FOR GAS DISCHARGE LAMP INCLUDING BOOSTER START CIRCUIT RESPONSIVE TO POWER UP CONDITION

FIELD OF INVENTION

This invention relates generally to electronic ballasts, and in particular to an electronic ballast which boosts starting frequency and voltage to facilitate starting of gas discharge lamps.

BACKGROUND OF THE INVENTION

Gas discharge lamps, such as fluorescent lamps, require a higher than normal operating voltage to be applied as a starting voltage to ionize the gas within the lamp. Traditionally, iron core and coil ballast systems operating at a frequency of 50–60 Hz have been employed to generate the higher than normal operating voltage. Iron core and coil ballast systems, however, are characterized by a low power factor, heavy weight, and large physical size. Additionally, they generate harmonics, radiate an audible buzz, and produce a bothersome light flicker.

DESCRIPTION OF THE PRIOR ART

In an improved starting technique, solid-state high frequency electronic ballast systems have been employed which use ferrite core transformers, improve the power factor, are smaller in size and less in weight, and produce virtually no audible noise. For soft start operation, the frequency of the filament voltage is temporarily increased to pre-heat the filaments. The Q factor of the starting circuit is relatively low under those conditions, so the lamp will not start and the filaments will not wear out as fast, while the filaments are being heated. While these types of ballasts have been known for a number of years, they have not been effective for use with the two pin compact fluorescent lamps.

An example of such a two pin lamp is described in U.S. Pat. No. 4,862,035, entitled "Fluorescent Lamp Unit Having Plural Separate Tubes In Particular Arrangement Of Circuit Elements". This type of lamp was not easily adapted for use with electronic ballasts because of its internal capacitor designed for starting with ballasts at a low frequency, typically 50 to 60 Hz.

SUMMARY OF THE INVENTION

The present invention discloses a system and a method for starting a gas discharge lamp by increasing tile driving power by raising the amplitude and the frequency of the starting voltage for a predetermined period of time. After the predetermined period of time lapses, a lower operating power level is accomplished by lowering the frequency and starting voltage in order to resume normal lamp operation. Switched mode control circuitry having an adjustable boost voltage is employed along with an oscillator having a first frequency for starting the lamp and a second frequency for steady state operation.

AC line voltage is rectified and applied to the boost regulator for stepping up the DC voltage. The boost voltage is applied to an inverter which chops the DC voltage into a high frequency AC voltage. The high frequency voltage is passed through an LC circuit or transformer to provide the appropriate matching impedance to the lamp.

A kickstart circuit is coupled to the boost regulator and to an oscillator which controls the chopping frequency of the inverter. On power up, the kickstart circuit boosts the start voltage and increases the oscillator frequency for a predetermined period of time for pre-heating the lamp.

One advantage of the present invention is that it incorporates desirable features of an electronic ballast while maintaining compatibility with low frequency, thermo-mechanical starting type lamps which incorporate a glow element. Another advantage of the present invention is that it is relatively small and light weight, is easily produced, has a power factor substantially near unity, and has substantially constant power output over a wide input voltage range.

BRIEF DESCRIPTION OF THE DRAWINGS

Referring now to the drawings in which like reference numerals and letters indicate corresponding elements throughout the several views.

DETAILED DESCRIPTION OF THE PREFERRED EMBODIMENT

Figure 1:
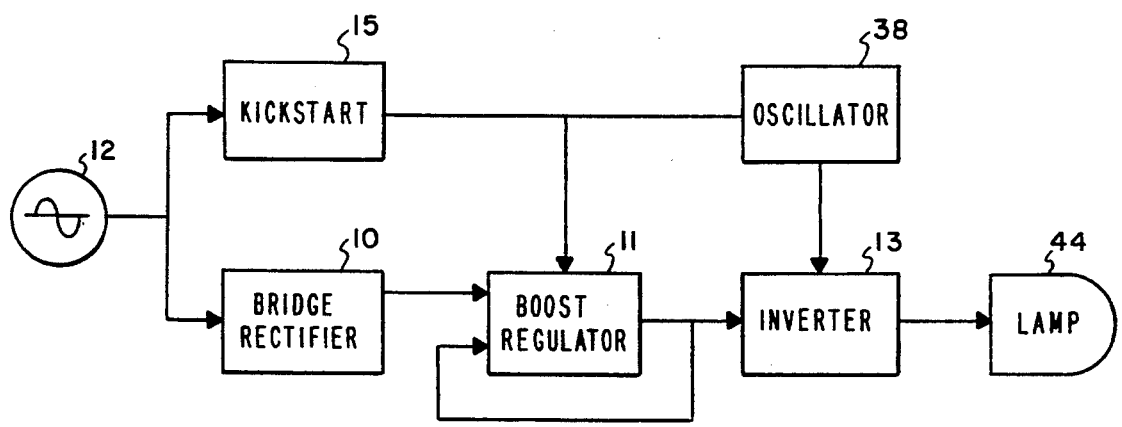
FIG. 1 is a general block diagram of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and circuit changes may be made without departing from the scope of the present invention.

Before describing the particular improved electronic ballast system and method practiced in accordance with the principles of the present invention, it should be noted that the invention resides primarily in a novel combination of conventional electronic circuits and not in a particular detailed configuration thereof. Accordingly, the structure, control, and arrangement of these conventional circuits have been illustrated in the drawings by readily understandable block representations and schematic diagrams, which show only those specific details that are pertinent to the present invention. Thus, the block and schematic diagram illustrations in the figures do not necessarily represent the specific circuit arrangement of the exemplary system, but are primarily intended to illustrate major components in a convenient functional group, wherein the present invention may be more readily understood.

Reference is made to FIG. 1 which shows a general block diagram of the present invention. AC line voltage 12 is impressed on bridge rectifier 10. A boost regulator 11 has a first input coupled to the bridge rectifier output and a second input coupled to feedback from its output. The boost regulator 11 is a closed loop device for stepping up the DC voltage in response to a control input from a kickstart circuit 15. The output of the boost regulator 11 is coupled to an inverter 13 which chops the stepped up DC voltage at a high frequency. The output of the inverter 13 is preferably transformed by an LC circuit to provide a high Q and matching impedance before application to the lamp 44.

The kickstart circuit 15, upon power up, steps up the boost voltage of regulator 11 and the frequency of oscillator 38 for a predetermined period of time. The increased amplitude and frequency expedites the ionization of the gas within lamp Reference is now made to FIG. 2 which shows an electronic ballast practiced in accordance with the principles of the present invention. The bridge rectifier 10 has impressed on it an AC voltage 12 of a frequency typically between 50–60 Hz and produces a rectified DC voltage on output conductor 14. Filter capacitor 16 filters the AC ripple as well as any high frequency noise produced by oscillator 38 on line 14. Inductor 18 has a first terminal coupled to capacitor 16 and the rectified DC voltage on line 14 and a second terminal coupled to the junction of the anode of diode 20 and switch 22. The output line 14 charges inductor 18 through closed switch 22 and current sense resistor 24. The current sense resistor 24 is of ample wattage rating to withstand high current flow through switch 22. The opening and closing of switch 22 is controlled by pulse width modulation (PWM) control circuit 26 described in more detail below. In the preferred embodiment, the switch 22 is a field effect transistor (FET) with ample voltage and current ratings to withstand the flyback operation of inductor 18.

Collectively, the inductor 18, switch 22, resistor 24, and PWM control circuit 26 cooperate together as a boost or step-up regulator 11. The boost voltage impressed across capacitor 32 through diode 20 is proportional to the sum of the voltage across capacitor 16 and the voltage produced by the inductance (L) of inductor 18 multiplied by the change in current (di/dt) through it. The step-up regulator 11 operates in a discontinuous flyback mode wherein oscillator 38 via PWM control circuit 26 turns on switch 22 and feedback from resistors 24 and 30 (30A and 30B) turns it off. When switch 22 is turned on by the PWM control circuit 26, the DC voltage on line 14 is impressed across conductor 18, switch 22, and resistor 24. The current ramps up and the inductor 18 stores energy in its core. When switch 22 is turned off from feedback from resistors 24 and 30, the voltage across the inductor 18 kicks back to resist the change in current (di/dt). The voltage across capacitor 16 and the voltage produced by the L.di/dt is impressed on capacitor 32 through diode 20. Diode 20 separates inductor 18 and capacitor 32, thus allowing for the voltage across capacitor 32 to be larger than the voltage impressed at line 14.

Figure 3:
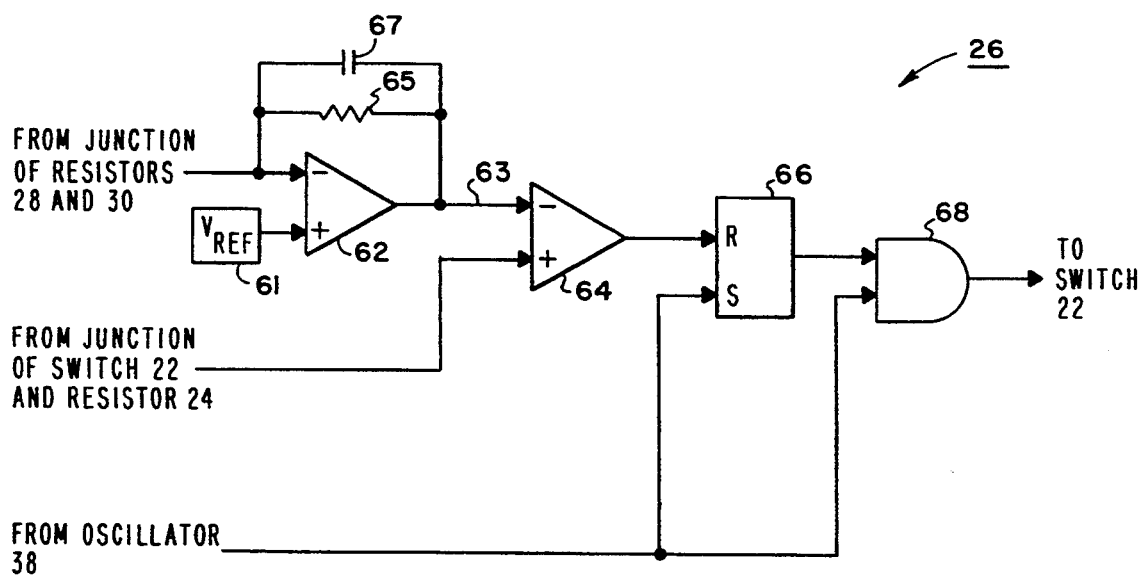
FIG. 3 is a simplified block diagram of the pulse width modulation (PWM) control circuit of FIG. 2.

Resistors 28 and 30 located on the cathode side of diode 20 form a voltage divider providing a second input voltage to PWM control circuit 26. The voltage across resistor 30 is proportional, through voltage division, to the boost voltage across capacitor 32. The feedback voltage to PWM control circuit 26 from resistors 24 and 30 provides current and voltage information respectively so that power delivered through diode 20 to capacitor 32 is maintained constant. The maximum level of peak current through inductor 18 is set by the output 63 of error amplifier 62 (FIG. 3). The error amplifier 62 compares the voltage across resistor 30 (which is proportional to the boost voltage) to a reference voltage ($V_{REF}$) produced by reference generator 61. The reference voltage $V_{REF}$ and the ratio of resistors 28 and 30 are preselected so that the desired boost voltage is maintained across capacitor 32.

A pair of series connected, mutually exclusive switches 34 and 36 are coupled between the boost voltage which is impressed across the capacitor 32 and the common ground. Switches 34 and 36 cooperate as an inverter 13, chopping the DC boost voltage into a square wave having a frequency equal to that of the oscillator. Switch 34 has its unswitched terminal coupled to the junction of capacitor 32 and the cathode of diode 20. The switched terminal of switch 34 is coupled to the junction of the switched terminal of switch 36 and the first terminal of inductor 40. The unswitched terminal of switch 36 is coupled to the common ground. In the preferred embodiment, switches 34 and 36 are complementary field effect transistors (FETS) with ample voltage and current ratings to withstand the reactive loads. Those skilled in the art will recognize other expedients for switches 34 and 36 without departing from the scope of the present invention.

Switches 34 and 36 are controlled by oscillator 38 to chop the DC boost voltage developed across capacitor 32 at the frequency of oscillator 38. That is, switches 34 and 36 are opened and closed alternately to produce a substantially square wave of a frequency equal to the oscillator 38 across inductor 40 and capacitors 42 and 43. It has been determined through simulation and experimentation that the preferred chopping frequency ranges typically from 40–50 KHz during normal operation to 60–80 KHz at lamp start-up.

Inductor 40 and capacitor 42 together with capacitor 46 form an LC circuit which provides a high Q factor and matching impedance for starting the lamp. The lamp 44 may be of the type described in U.S. Pat. No. 4,862,035, herein incorporated by reference. The capacitor 43 provides DC isolation for the lamp circuit.

Figure 2:
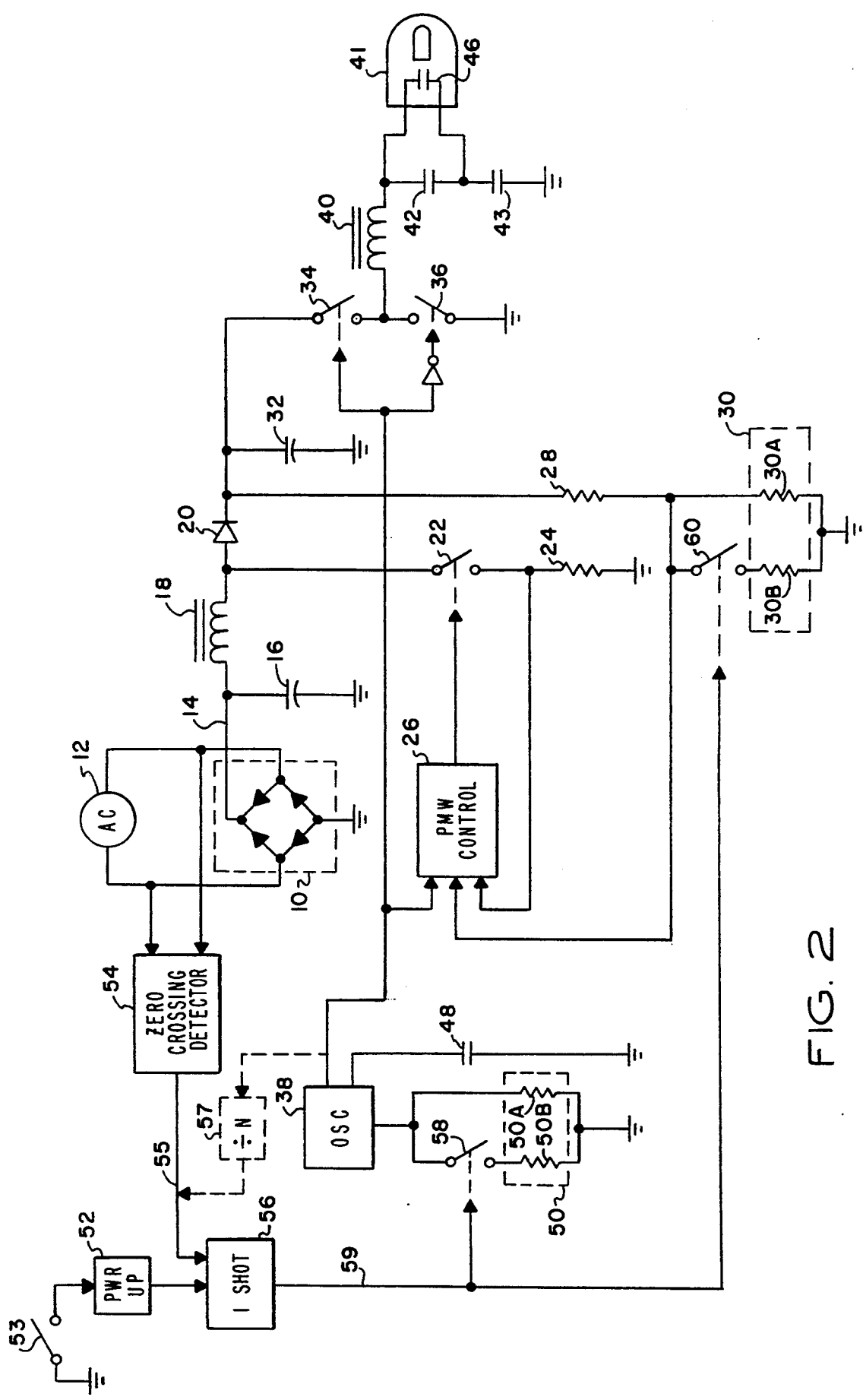
FIG. 2 is an electronic ballast system practiced in accordance with the principles of the present invention.

With reference to FIG. 2, the oscillator 38 oscillates at a frequency proportional to the capacitance of capacitor 48 and the resistance of resistor 50 (50A and 50B). Other expedients are known for oscillator 38, the exact configuration not being necessary for the understanding of the present invention. Oscillator 38 may be part of or included in PWM control circuitry 26. However, for clarity, FIG. 2 depicts oscillator 38 separately from PWM control circuitry. Zero crossing detector 54 has its inputs coupled across AC voltage 12 and its output coupled to an input on line 55 of one-shot multivibrator 56. Zero crossing detector 54 provides a relatively low frequency clock for determining the period of the one-shot 56. Many expedients are known for zero crossing detector 54, the exact configuration not being necessary for the understanding of the present invention. It is to be understood that oscillator 38 could also be divided down (depicted as phantom divider 57) and used as a clock for one-shot multivibrator 56 on line 55.

Upon power up, the power up enable circuit 52 enables or resets the one-shot 56 to be clocked by zero crossing detector 54 The power up enable circuit 52 resets the circuit upon power up. After one-shot multivibrator 56 is enabled, it is clocked by zero crossing detector 54 on the subsequent pulse on line 55. After the predetermined time set by one-shot 56 expires, it is disabled until power is recycled. The power up enable circuit 52 may optionally include a reset input, coupled to a reset switch 53, for optionally initiating the kickstart process without powering down AC voltage 12.

The output 59 of the one-shot multivibrator 56 has a dual purpose. First, it enables the switch 58 to insert resistor 50B in parallel with the resistor 50A thereby decreasing the effective resistance 50 and increasing the frequency of oscillator 38. Moreover, the output 59 of the one-shot 56 closes a switch 60 to insert resistor 30B in parallel with resistor 30A thereby decreasing the effective resistance 30. Decreasing the bottom leg of the resistive divider comprised of resistors 28 and 30 forces the boost voltage across capacitor 32 to increase as described herein.

The increase in applied frequency and boost voltage more readily ionizes the gas in lamp 44. It has been determined through experimentation and simulation that the preferred preselected boost interval for starting fluorescent lamps is between 1–4 seconds. Those skilled in the art will recognize with the aid of the present disclosure and without undue experimentation, other preferred times and values for resistors 30A, 30B and 50A, 50B for other types of gas discharge lamps.

Reference is made to FIG. 3 which depicts a more detailed view of the PWM control circuit 26 in FIG. 2. It should be understood that FIG. 3 only depicts the preferred embodiment and that other switched mode power PWM converters may be adapted for use as the PWM control circuit 26 without departing from the scope of the present invention. Exemplary, but not exclusive of another PWM control circuit 26 adaptable for use with the present invention, is the UC384-2/UC3844 PWM circuit from the Unitrode Integrated Circuit Corporation of Merrimack, N.H.

With reference to FIG. 3, an error amplifier 62 has its inverting input coupled to the junction of resistors 28 and 30. It has a resistor 65 and capacitor 67 coupled between the inverting input and its output 63. Its non-inverting input is coupled to a reference voltage generator 61. The voltage generator 61 may be a zener diode or other suitable regulator. The reference voltage $V_{REF}$ is selected to be a voltage which is proportional to the boost voltage across capacitor 32 multiplied by the ratio of the voltage divider formed by resistors 28 and 30. For example, if $V_{REF}$ is set to 2.5 volts, the boost regulator would regulate the boost voltage across capacitor 32 to a value such that the voltage drop across resistor 30 would be substantially 2.5 volts. The output 63 of error amplifier 62 is coupled to the inverting input of current sense comparator 64. The non-inverting input of comparator 64 is coupled to the junction of switch 22 and resistor 24. The voltage drop across resistor 24 is proportional to the current flowing through inductor 18 of the boost regulator.

When the voltage drop across resistor 24 equals or exceeds the output 63 of error amplifier 62, the comparator trips and resets flip flop 66 thus providing a signal to a first input of AND gate 68 for opening switch 22. The process is repeated on subsequent oscillator clock pulses wherein oscillator 38 sets flip flop 66 and comparator 64 resets it when the desired current is obtained. In this manner, a closed loop system is maintained to regulate the boost voltage. The inductor 18 is initially charged on each clock pulse of oscillator 38 until the sensed current equals the output of error amplifier 62. Since the oscillator 38 operates at a frequency many times higher than the AC line frequency, the inductor 18 charges and discharges hundreds of times during one cycle of the AC line. This provides substantially in-phase voltage and current to the lamp 44 load and a power factor of nearly unity.

The oscillator 38 is also coupled to a second input of AND gate 68. AND gate 68 is a protective measure requiring both the oscillator 38 and the output of flip flop 66 be high in order to energize switch 22. This feature ensures that if comparator 64 does not reset flip flop 66, then switch 22 will only be on for one-half the duty cycle of oscillator 38.

The foregoing description of the preferred embodiment of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description but rather by the claims appended hereto.

What is claimed is:

1. A power supply for applying start-up power from an AC power source to a gas discharge lamp during a start-up interval and for applying operating power at an operating voltage amplitude and frequency to a gas discharge lamp during an operating interval comprising:

a power up circuit responsive to the application of AC power from an AC power source to the power supply for generating an enable signal during a start-up interval;

circuit means coupled to the power UP circuit and responsive to the enable signal for applying a start-up voltage having an increased amplitude relative to the amplitude of the operating voltage across a gas discharge lamp to ionize gas within the lamp during the start-up interval, and thereafter applying an operating voltage having a reduced amplitude relative to the amplitude of the start-up voltage; and circuit means coupled to the power up circuit and responsive to the enable signal for increasing the frequency of the start-up voltage applied across a gas discharge lamp during the start-up interval to a frequency greater than the frequency of the operating voltage, and thereafter reducing the frequency of the operating voltage to an operating frequency which is less than the frequency of the start-up voltage, 2. A power supply as recited in claim 1 wherein the circuit means for generating the voltage of increased amplitude includes a boost regulator comprising:

a bridge rectifier having input terminals adapted to receive AC power from an AC power source and having output terminals for conducting DC current;

a storage capacitor connected across the DC output terminals of the bridge rectifier;

an inductor having an input terminal connected to one of the output terminals of the bridge rectifier, and having an output terminal;

a current sensing resistor coupled to the bridge rectifier output terminal;

a gate-controlled switch having switched and un-switched terminals, one of the switch terminals being coupled to the output terminal of the inductor and the other terminal being coupled to the current sensing resistor; and, a control circuit having an input coupled to the sensing resistor and having an output coupled to the gate of the gate controlled switch for rendering the switch conductive and non-conductive at a periodic switching rate, the control circuit being enabled in response to a difference between the voltage dropped across the sensing resistor as a result of current flow conducted through the gate controlled switch and a reference voltage which is a predetermined fraction of the output voltage applied to the gas discharge lamp.

3. A power supply as recited in claim 1 wherein the means for increasing the frequency of the start-up voltage is an oscillator having a first and a second selectable frequency, the first frequency being selected in response to the enable signal and the second frequency being selected in response to the absence of the enable signal.

4. An electronic ballast power supply circuit for a gas discharge lamp comprising:
   a bridge rectifier having an input adapted for connection to an AC voltage source and having an output for providing a rectified DC voltage;
   a boost regulator for boosting the DC voltage having an input coupled to the output of the bridge rectifier and an output for conducting the boosted DC voltage;
   an oscillator having an output for providing a clock signal of a first frequency and a second frequency;
   an inverter having a power input coupled to the output of the boost regulator, a control input coupled to the oscillator output, and having an output for providing a square wave signal having a frequency substantially equal to that of the oscillator and an amplitude substantially equal to that of the boost regulator output; and,
   a power up circuit responsive to the of AC power from an AC power source to the power supply for generating an enable signal during the start-up interval;
   control circuit means coupled to the power up circuit, the boost regulator and the oscillator for increasing the amplitude and increasing the frequency of the inverter output for a predetermined time interval in response to the enable signal and thereafter reducing the amplitude and reducing the frequency of the inverter output in response to termination of the enable signal.

5. An electronic ballast power supply as recited in claim 4 further comprising reset means coupled to the power up circuit for generating the enable signal in response to a reset condition other than a power up condition.

6. An electronic ballast power supply as recited in claim 4 wherein the power up circuit comprises:
   a zero crossing detector coupled to the bridge rectifier for generating a clock signal;
   a power up detector for generating a reset signal in response to a power up condition; and,
   a one shot multivibrator coupled to the clock signal and the reset signal for generating the enable signal in response to a predetermined clock signal count.

7. An electronic ballast power supply for starting gas discharge lamps comprising:
   a bridge rectifier having an input adapted for connection to an AC voltage source and having an output for providing rectified DC voltage;
   a first capacitor having a first terminal coupled to the output of the bridge rectifier and a second terminal coupled to a common ground;
   an inductor having a first terminal and a second terminal, the first terminal being coupled to the first terminal of the first capacitor and to the output of the bridge rectifier;
   a gate controlled switch having switched and unswitched terminals, one of the switched terminals being coupled to the second terminal of the inductor;
   a first resistor having a first terminal coupled to the of the first switch and a second terminal coupled to the common ground;
   a diode having an anode and a cathode, the anode being coupled to the second terminal of the inductor and to the first terminal of the gate controlled switch;
   a second capacitor having a first end coupled to the cathode of the diode and a second end coupled to the common ground;
   voltage divider means, coupled between the cathode of the diode and the common ground, for supplying a feedback voltage representative of a voltage impressed across the second capacitor;
   an oscillator having an output with selectable first and second frequency;
   invertor means, coupled between the cathode of the diode and the common ground and being controlled by the output of the oscillator, for chopping the voltage impressed across the second capacitor; and,
   a control circuit having an input coupled to the sensing resistor and having an output coupled to the gate of the gate controlled switch for rendering the switch conductive and non-conductive at a switching rate which exceeds the frequency of the AC power source, the control circuit being enabled in response to a difference between the voltage dropped across the sensing resistor as a result of current flow conducted through the gate controlled switch and a reference voltage which is a predetermined fraction of the output voltage applied to the gas discharge lamp.

8. A method for starting and operating a gas discharge lamp comprising the steps:
   applying an AC voltage of increased amplitude across a gas discharge lamp to ionize gas within the lamp during a start interval in response to a power up condition, and thereafter reducing amplitude of the AC voltage; and
   increasing the frequency of the voltage applied across the gas discharge lamp during the start interval in response to the power up condition, thereafter reducing the frequency of the AC voltage to a lower frequency.

9. A power supply for applying start-up power from an AC power source to a gas discharge lamp during a start-up interval and for applying operating power to the gas discharge lamp during an operating interval comprising, in combination:
   a supply circuit adapted for connection to an AC power source for generating operating voltage having an operating amplitude and operating frequency, and for generating a start-up voltage having an increased amplitude and increased frequency relative to the amplitude and frequency of the operating voltage, respectively; and,
   circuit means coupled to the supply circuit for applying the start-up voltage across the gas discharge lamp to ionize gas within the lamp during the start-up interval, and thereafter applying the operating voltage across the gas discharge lamp during the operating interval.

* * * * *